(12) United States Patent
Hemade

(10) Patent No.: US 8,510,718 B2
(45) Date of Patent: Aug. 13, 2013

(54) PLATFORM VERIFICATION PORTAL

(75) Inventor: Rhythm Hemade, London (GB)

(73) Assignee: UBS AG, Zurich (CH)

( * ) Notice: Subject to any disclaimer, the term of this patent is extended or adjusted under 35 U.S.C. 154(b) by 1083 days.

(21) Appl. No.: 12/492,727

(22) Filed: Jun. 26, 2009

(65) Prior Publication Data

US 2010/0005529 A1    Jan. 7, 2010

Related U.S. Application Data

(60) Provisional application No. 61/076,985, filed on Jun. 30, 2008.

(51) Int. Cl.
*G06F 9/44* (2006.01)

(52) U.S. Cl.
USPC .......................................................... 717/126

(58) Field of Classification Search
USPC .................................. 709/224; 717/126, 121
See application file for complete search history.

(56) References Cited

U.S. PATENT DOCUMENTS

| | | | |
|---|---|---|---|
| 4,558,413 A | 12/1985 | Schmidt et al. | |
| 6,256,773 B1 | 7/2001 | Bowman-Amuah | |
| 6,457,170 B1 | 9/2002 | Boehm et al. | |
| 6,681,382 B1 | 1/2004 | Kakumani et al. | |
| 6,766,334 B1 | 7/2004 | Kaler et al. | |
| 7,260,818 B1 | 8/2007 | Iterum et al. | |
| 2004/0123268 A1 | 6/2004 | Lundberg et al. | |
| 2005/0091227 A1 | 4/2005 | McCollum et al. | |
| 2005/0204343 A1 * | 9/2005 | Kisamore et al. | 717/124 |
| 2005/0262501 A1 | 11/2005 | Marinelli et al. | |
| 2006/0167919 A1 | 7/2006 | Hsieh | |
| 2006/0179116 A1 * | 8/2006 | Speeter et al. | 709/217 |
| 2007/0168493 A1 * | 7/2007 | Sarwono et al. | 709/224 |
| 2007/0239748 A1 | 10/2007 | Smith | |
| 2008/0059946 A1 | 3/2008 | Harding et al. | |
| 2009/0307600 A1 * | 12/2009 | Arthur et al. | 715/740 |

FOREIGN PATENT DOCUMENTS

| | | |
|---|---|---|
| GB | 2423168 | 8/2006 |
| WO | WO 99/34557 | 7/1999 |

OTHER PUBLICATIONS

Ambriola et al., "The evolution of configuration management and version control," *Software Engineering Journal*, 5(6):303-310 (1990).
Hsu, Liang H., "Configuration Management in the HILDA System," *IEEE*, 154-160 (1990).
Lubkin, David, "Heterogeneous Configuration Management with DSEE," *Proc. of the 3rd Int. Workshop on Software Configuration Management*, Trondheim, Norway, 153-160 (Jun. 12-14, 1991).
International Search Report and Written Opinion for International Application No. PCT/GB2009/050760, Date of Mailing Oct. 1, 2009 (15 pages).

* cited by examiner

*Primary Examiner* — Anna Deng
(74) *Attorney, Agent, or Firm* — Pillsbury Winthrop Shaw Pittman LLP

(57) ABSTRACT

Described are computer-based methods and apparatuses, including computer program products, for a platform verification portal. A plurality of configuration items are stored with each comprising a plurality of verification commands capable of being executed by a verification scanning engine executing a verification scan on a target server to compare a set of actual software or configuration settings of the software against a desired software stack. A plurality of configuration item rules is stored. Execution of one or more verification scanning engines across a selected set of target servers is remotely initiated. A request for configuration items is received from each of the target servers. For each of the target servers a set of configuration items applicable to the target server is dynamically selected. For each of the target servers, a list identifying the set of configuration items is transmitted to the target server for execution by the verification scanning engine.

19 Claims, 14 Drawing Sheets

FIG. 2

Verification Execution

Verification Job Creation

Server Selection

Please select a Server Filter:

| Application Code | Environment Code | Software Code | Role Code | Single Server |
|---|---|---|---|---|
| WINTEL_QA ▽ | (all) ▽ | (all) ▽ | (all) ▽ | [ ] Select |

↙ 210

Selected Servers:

| | Server Name | | Application Code | Environment Code | Software Code | Role Code |
|---|---|---|---|---|---|---|
| ☑ | SERVER00 | Show CIs | WINTEL_QA | PROD | | |
| ☑ | SERVER01 | Show CIs | WINTEL_QA | PROD | IIS6 | IIS |

3. Please click Queue Scan to proceed scanning these servers:  (Queue Scan) (Cancel)

Configuration Items for Server: SERVER01

| Configuration Items Name | Configuration Items Filename |
|---|---|
| Windows baseline | Windows_baseline.xml |

Total CIs: 1

FIG. 4A

Configuration Item Rules

| Rule Active | Configuration Item | Comment | | Filter by CI: (all) ▽ | OK |
|---|---|---|---|---|---|
| ▽ | | | | | |
| ▽ | | | | | |
| ▽ | | | | | |
| ▽ | | | | | |
| ▽ | | | | | |
| ▽ | Windows baseline ▽ ↙510 | Application: (any) ▽ | Environment: (any) ▽ ↙520 | | |
| | | Software: (any) ▽ | Role: (any) ▽ | | |
| | | Server Name: SERVER01 ▽ | Comment: AA, 12June2008 | | |
| | | ☐ Exclusion rule | | Add  Cancel | |

(Add New)

FIG. 7

```
- <Object Type="File" Name="FileVersion0" Key2="C:\Program Files\Microsoft BizTalk Server 2004\1033\BTSMsg.dll"
    Key5="Files">
  - <Setting Key1="Version">
    <Rule Name="FileVersionNotEqualTo_0" Query="$. != '3.0.7405.0'" P1="'3.0.7405.0'" Severity="Warning"
      EventID="12666" Text="File version mismatch for file C:\Program Files\Microsoft BizTalk Server
      2004\1033\BTSMsg.dll" AlwaysEvaluate="True" />
    <Rule Name="FileVersionNotEqualTo_0_exchk" Query="$." AlwaysEvaluate="True" />
  </Setting>
  </Object>

- <Object Type="Group">
  - <Setting>
    <Rule Name="FileVersionNotEqualTo_0_exchk_countdependency"
      Query="count($FileVersionNotEqualTo_0_exchk)=0" P1="0" Severity="Error" EventID="13666" Text="Object of
      type 'File' at 'C:\Program Files\Microsoft BizTalk Server 2004\1033\BTSMsg.dll' is missing" AlwaysEvaluate="True"
      />
  </Setting>
  </Object>
```

Desired Configuration Specification

📄 Configuration Item Upload

Configuration Items are created to measure configuration setting against servers. CIs are specified in Excel format, and can be uploaded to the portal using this page.

Please ensure the latest version of the template is used (download here).

CI XML or XLS file: [C:\AA\PVP\Windows_bas] (Browse...)
CI Name: [Windows baseline]
CI Version: [0.01]
Comment: [AA12Jun2008]

(Upload) (Cancel)

FIG. 10B

📄 Configuration Item Upload

Configuration Items are created to measure configuration setting against servers. CIs are specified in Excel format, and can be uploaded to the portal using this page.

Please ensure the latest version of the template is used (download here)

√ Successfully Uploaded Configuration Item Windows_baseline.xls (Convert) (Cancel)

FIG. 10C

| ID | File Name | Version | Last Modified | Size |
|---|---|---|---|---|
| 1 | C:\Program Files\Microsoft BizTalk Server 2004\1033\BTSMsg.dll | 3.0.7405.0 | 10/18/2006 1:57:18 PM | |

FIG. 10D

Configuration Item Upload

Configuration Items are created to measure configuration setting against servers. CIs are specified in Excel format, and can be uploaded to the portal using this page.

Please ensure the latest version of the template is used (download here).

✓ Successfully Uploaded Configuration Item Windows_baseline.xls

✓ Successfully Generated Configuration Item XML Windows_baseline.xml (view)

(Import) (Cancel)

```
Reading template sheet "WMI"...
Reading template sheet "INI"...

adding Registry object: Hive =
HKEY_LOCAL_MACHINE, Path =
Software\Microsoft\Windows NT\CurrentVersion,
Value = CSDVersion, Data = Service Pack 4,
Scope = Base Finished at 12/06/2008 11:29:59
Created  0  File-based rules
Created  0  SQL cofiguration rules
Created  0  WMI-based rules
Created  0  XML-based rules
Created  1  Registry-based rules
Created  0  INI File-based rules
Created  0  Directory-based rules
```

FIG. 10E

PLATFORM VERIFICATION PORTAL

CROSS REFERENCES TO RELATED APPLICATIONS

This application claims the benefit of U.S. Provisional Patent Application No. 61/076,985, entitled "Platform Verification Portal," filed on Jun. 30, 2008, the disclosure of which is hereby incorporated herein by reference in its entirety.

FIELD OF THE INVENTION

The present invention relates generally to computer-based methods and apparatuses, including computer program products, for a platform verification portal.

BACKGROUND

Software is installed in logical layers, such as operating system layer and application layers that must be precisely configured in order to provide end users with specific functions. Collectively, the layers and configuration settings of the software is typically referred to as a software stack or simply stack. Each layer in the stack can impact the functioning of the other layers. As a result, any inconsistency in the stack can result in a computer system becoming unstable and causing production outages.

In order to avoid undesirable behavior of a computer system and to reduce the operational risks, it is important that the software stack is built accurately. However, in practice it is challenging to build a stack that is consistent with what was intended. Latent defects in the stack may not become known until after there is a serious disruption of service with the computer systems in production. Such production system outages can be successfully avoided if the stack defects are identified and dealt with in timely manner.

Typically, in a corporate enterprise, each stack layer is installed, configured and/or supported by disparate teams with relevant skills. Often, defects are introduced as result of inaccurate installation processes, human errors, handover from one team to another, etc. The difficulty in building a defect-free stack is compounded further by quality of the installation packages and fixes. Often, installation packages report successful installation of software or software fixes when, in fact, certain aspects of an installation failed, introducing defects in the stack.

To successfully verify a built stack against the intended at a granular level, it is imperative that there is a robust and efficient mechanism to test the stack down to finer details such as versions of binaries, registry entries, and other configuration settings of the software stack installed and configured on individual servers of a server estate.

SUMMARY

There are a number of commercially available platform verification tools. One such platform verification tool is Microsoft Desired Configuration Management (DCM). Microsoft DCM enables a user to create command scripts, referred to as configuration items that are executed in order to verify compliance of specific configuration settings of a software stack against a desired set of configuration setting values. For example, DCM can verify the configuration settings of various data sources that comprise a server stack operating on the Window operating system, including the Registry, File System, Active Directory, Windows Management Instrumentation (WMI), SQL Server, IIS Meta base, for example. However, DCM along with other known verification tools presents certain disadvantages in providing enterprise level usability and scalability.

With respect to the authoring of configuration items, use of known graphical authoring tools for creating configuration items is complicated, requiring significant user training in order to gain proficiency. For example, DCM provides a graphical CI authoring tool that requires the user to navigate through the numerous processing steps in order to create a configuration item with only one verification command.

With respect to platform verification scanning, known platform verification tools such as DCM are capable of providing only scheduled execution of verification scans across multiple target servers. On-demand execution of platform verification scans on multiple servers requires users to individually log into each server to execute such scans. Furthermore, known verification tools are not capable of dynamic selection of configuration items at runtime for use in platform verification scans on individual target servers. Rather, configuration items are typically distributed across a population of target servers in advance of a scheduled verification scan. As a result, some of the distributed configuration items may not be applicable to certain target servers, causing the generation of erroneous non-compliance event logs.

Embodiments of the present invention are capable of addressing the deficiencies with such prior platform verification tools. In one embodiment, there is a method. The method is for performing verification scanning. The method includes, at a server, storing a plurality of configuration items, each configuration item comprising a plurality of verification commands capable of being executed by a verification scanning engine executing a verification scan on a target server to compare a set of actual software or configuration settings of the software against a desired software stack. The method also includes storing a plurality of configuration item rules, each configuration item rule defining server criteria to which a corresponding configuration item applies. The method also includes remotely initiating execution of one or more verification scanning engines across a selected set of target servers. The method also includes receiving a request for configuration items from each of the target servers. The method also includes, for each of the target servers, dynamically selecting a set of configuration items applicable to the target server according to the plurality of configuration item rules and transmitting a list identifying the set of configuration items to the target server for execution by the verification scanning engine. The method can also include, for each of the target servers, downloading the dynamically selected set of configuration items to the target server for execution by the verification scanning engine.

In another embodiment, there is a computer program product. The computer program product is tangibly embodied in a computer readable storage medium. The computer program product includes instructions being operable to cause a data processing apparatus to store a plurality of configuration items, each configuration item comprising a plurality of verification commands capable of being executed by a verification scanning engine executing a verification scan on a target server to compare a set of actual software or configuration settings of the software against a desired software stack. The computer program product also includes instructions being operable to cause a data processing apparatus to store a plurality of configuration item rules, each configuration item rule defining server criteria to which a corresponding configuration item applies. The computer program product also includes instructions being operable to cause a data processing apparatus to remotely initiate execution of one or more verification scanning engines across a selected set of target servers. The computer program product also includes instructions being operable to cause a data processing apparatus to receive a request for configuration items from each of the target servers. The computer program product also includes instructions being operable to cause a data processing apparatus to, for each of the target servers, dynamically select a set of configuration items applicable to the target server according to the plurality of configuration item rules and transmitting a list identifying the set of configuration items to the target server for execution by the verification scanning engine. The computer program product can also include instructions being operable to cause a data processing apparatus to for each of the target servers, download the set of configuration items to the target server for execution by the verification scanning engine.

In another embodiment, there is a system. The system is for performing verification scanning. The system includes a database configured to store data. The system also includes a web server in communication with the database configured to remotely initiate execution of one or more verification scanning engines across a selected set of target servers, wherein the selected set of target servers comprises one or more target servers. The system also includes a database server in communication with the database and the web server configured to store a plurality of configuration items in the database, each configuration item comprising a plurality of verification commands capable of being executed by a verification scanning engine executing on a target server to compare a set of actual software or configuration settings of the software against a desired software stack. The database server is also configured to store a plurality of configuration item rules in the database, each configuration item rule defining server criteria to which a corresponding configuration item applies. The database server is also configured to receive a request for configuration items from each of the target servers in the selected set of target servers. The database server is also configured to, for each of the target servers in the selected set of target servers, dynamically select a set of configuration items applicable to the target server according to the plurality of configuration item rules and transmit a list identifying the set of configuration items to the target server for execution by the verification scanning engine. The database server can also configured to, for each of the target servers in the selected set of target servers, download the set of configuration items to the target server for execution by the verification scanning engine.

In other embodiments, any of the embodiments above can include one or more of the following features. In some examples, simultaneous execution of a plurality of verification scanning engines across the selected set of target servers is remotely initiated. A command can be received from a user input through an electronic user interface causing remote initiation of the one or more verification scanning engines. A command can be received from a second server causing remote initiation of the one or more verification scanning engines.

In other examples, a set of configuration item rules that define server criteria for an associated server is obtained. Dynamically selecting can include automatically comparing a server profile of a target server from the selected set of target servers against the server criteria of the corresponding set of configuration item rules corresponding to a configuration item. Dynamically selecting can include, where the server profile of the target server satisfies the server criteria of the corresponding set of configuration item rules, adding the configuration item to a set of configuration items applicable to the target server. Results of a verification scan performed by the corresponding verification scanning engines can be requested from the selected set of target servers.

In some examples, an electronic user interface is presented through which a user selects one or more of the plurality of stored configuration items, a configuration item rule is created that defines selection criteria for identifying target servers to which the selected configuration item applies based on user input data entered through the user interface, and the configuration item rule is stored in a database, the configuration item rule being associated with the one or more selected configuration items.

In other examples, data provided in a spreadsheet format is received that identifies configuration setting parameters and desired values for the configuration setting parameters for at least a portion of a software stack installed and configured in one or more target servers, and the data in the spreadsheet format is translated into a configuration item, the configuration item comprising an electronic document defining verification commands derived from the data provided in the spreadsheet format. The verification commands can be defined according to a predefined structured language capable of being processed by a verification scanning engine that executes on the one or more target servers to ensure that the software stack is installed and configured in compliance with the desired values for each of the configuration setting parameters.

Other aspects and advantages of the present invention will become apparent from the following detailed description, taken in conjunction with the accompanying drawings, illustrating the principles of the invention by way of example only.

BRIEF DESCRIPTIONS OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a screen shot of an exemplary user interface enabling browser clients to perform a variety of tasks related to platform verification of a plurality of remote target servers.

Figure 4B:
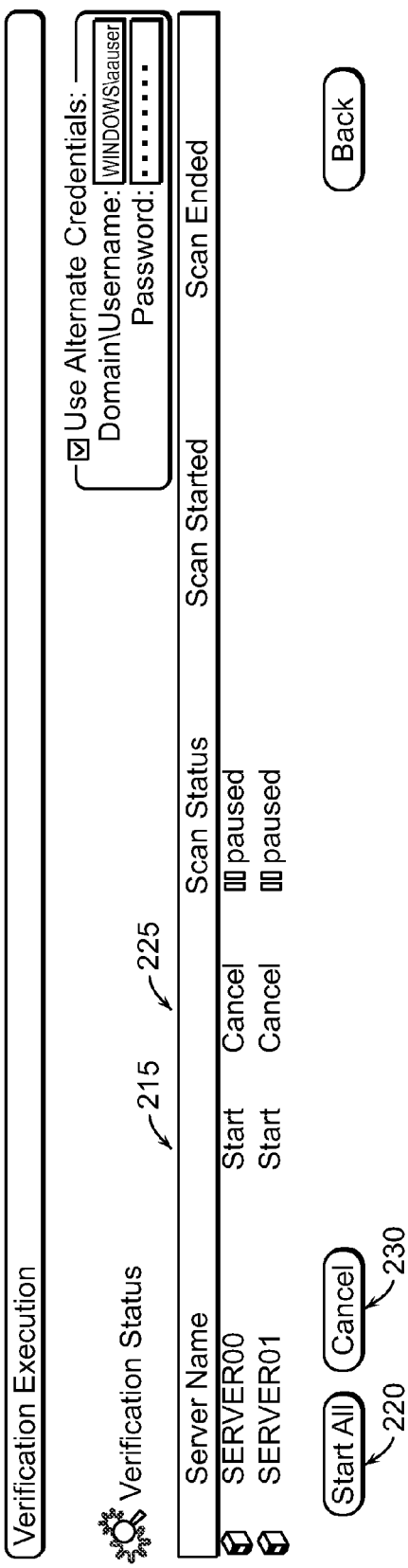
FIG. 4A is a screen shot of an exemplary user interface for selecting one or more target servers based on a user-specified set of filtering criteria.
Figure 4C:
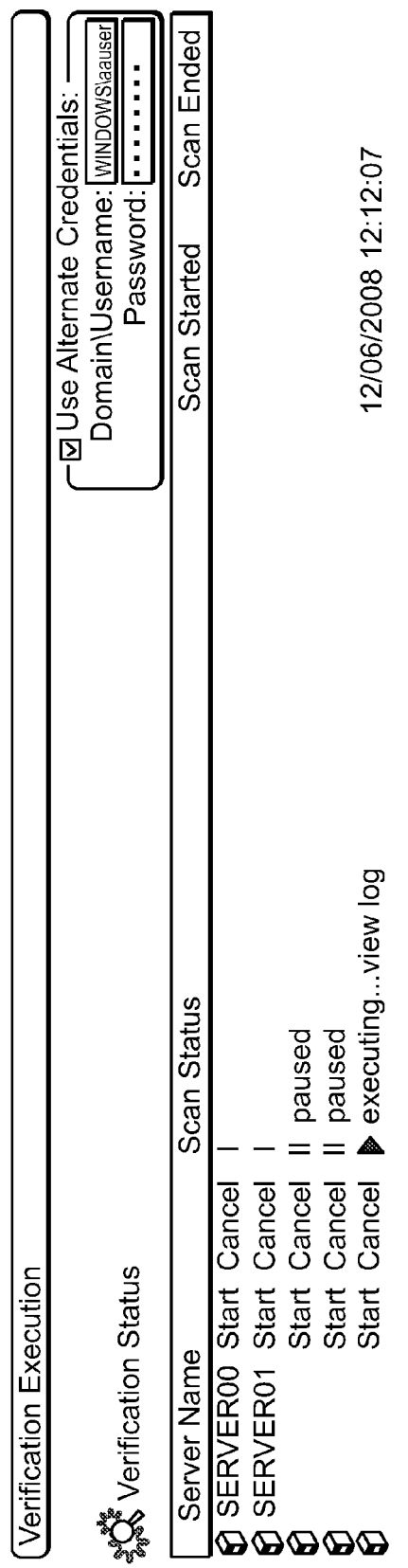
Figure 5:
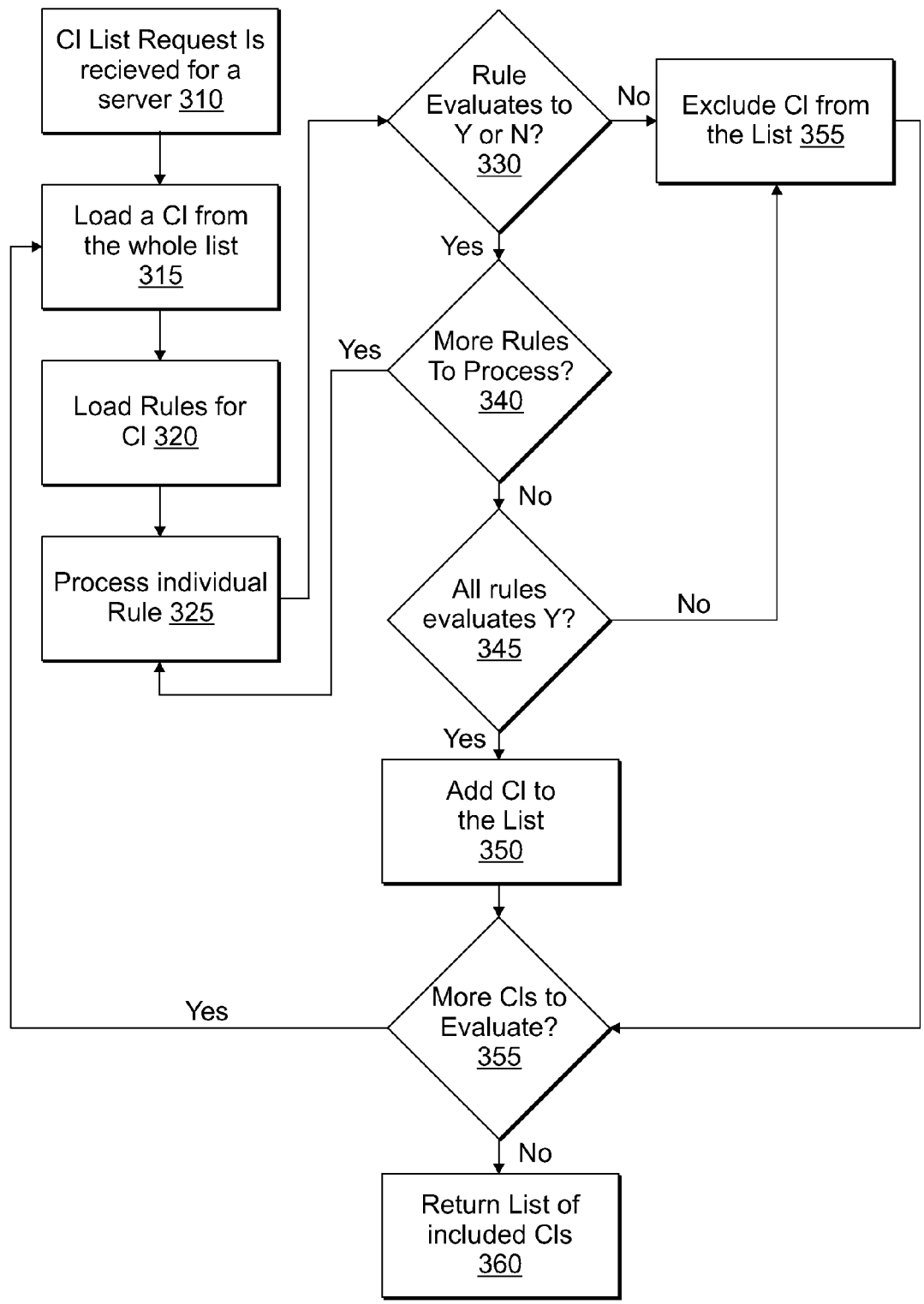

FIG. 4B is a screen shot of an exemplary user interface through which a user can remotely initiate verification scans on multiple target servers FIG. 4C is a screen shot of an exemplary user interface through which a user can request access to view event log results of a verification scan FIG. 5 is a flow diagram illustrating a method for selecting subset of relevant configuration items dynamically at runtime for a given server from a superset of configuration items.

Figure 6:
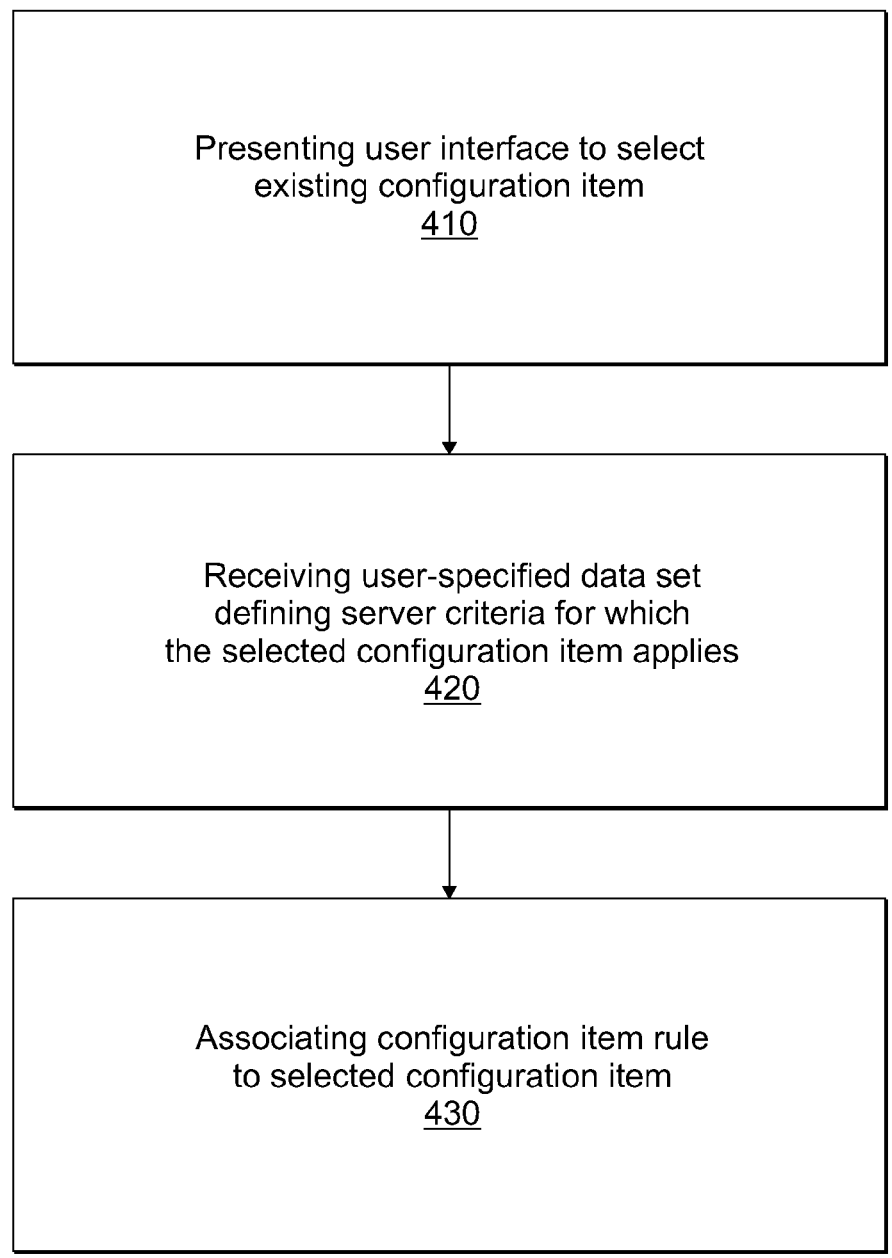

FIG. 6 is a flow diagram illustrating a method for creating a rule for associating configuration item with target servers according to one embodiment.

FIG. 7 is a screen shot of an exemplary user interface for creating a rule for associating an existing configuration item with target servers.

FIG. 8 is a diagram containing a sample verification command in a typical configuration item (CI).

Figure 9:
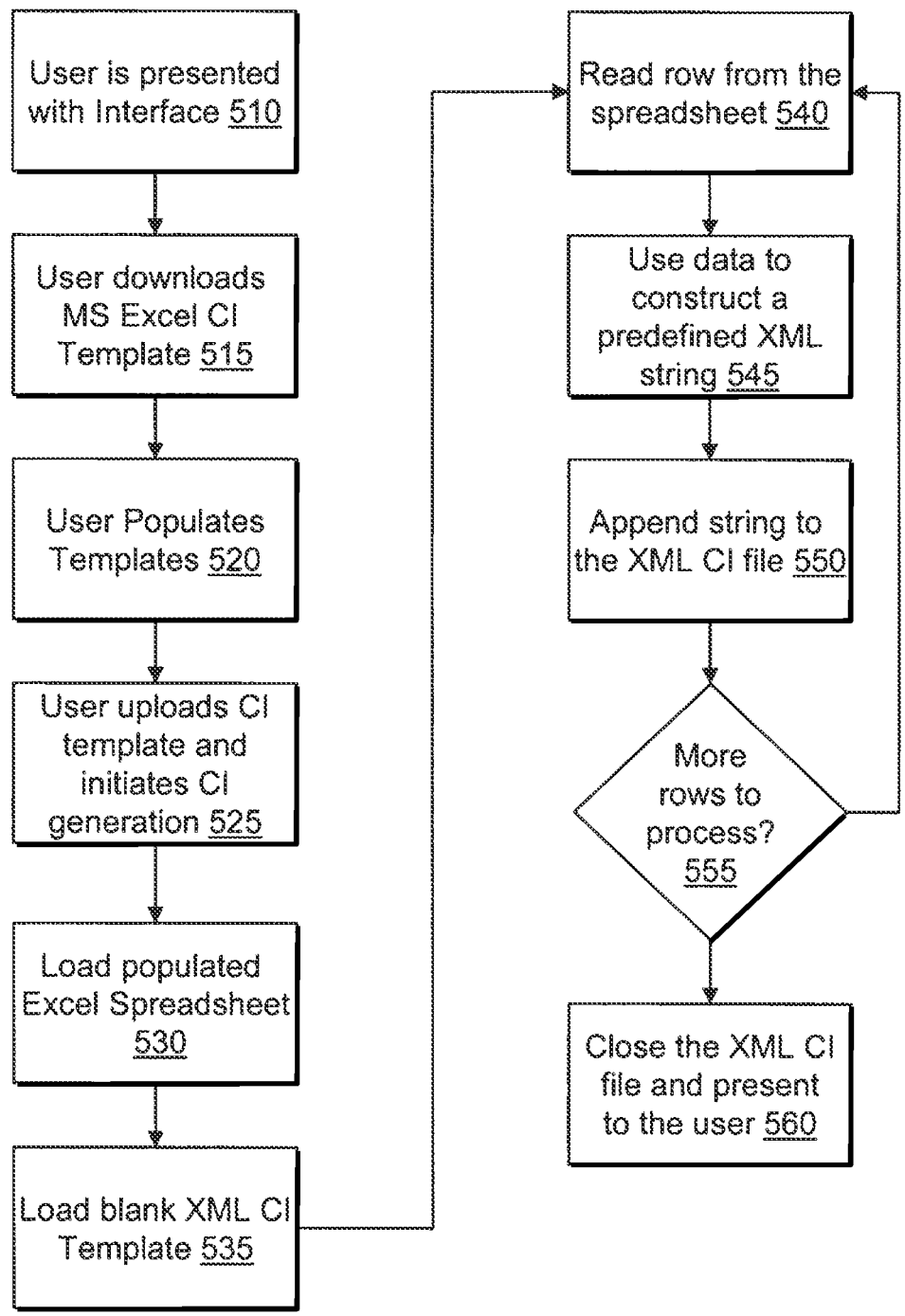

FIG. 9 is a flow diagram illustrating a method for automatically generating a configuration item according to one embodiment.

Figure 10A:
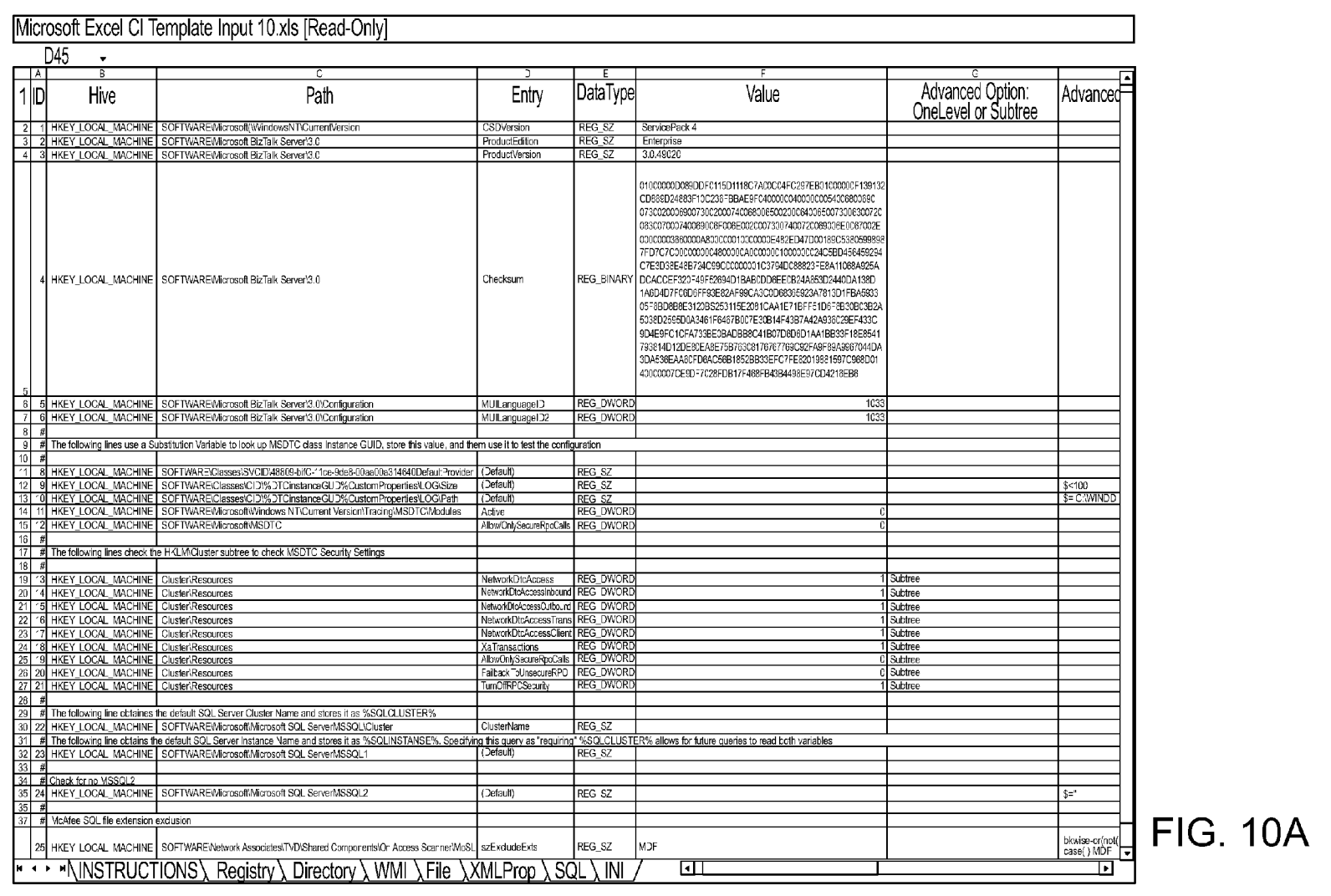

FIG. 10A is a screen shot illustrating an exemplary CI template.

FIG. 10B is a screen shot of a web page interface through which a user can browse to the populated CI template to upload.

FIG. 10C is a screen shot of an exemplary user interface through which the user can convert the CI template into a configuration item FIG. 10D is a screen shot of a row in an exemplary spreadsheet that is used to construct the verification string in the configuration item of FIG. 8.

FIG. 10E is a screen shot of an exemplary user interface that displays the status and log of actions taken while creating configuration item in a predefined format, such as XML, for different data sources.

DETAILED DESCRIPTION

The Platform Verification Portal (PVP) can provide computer system and method for verifying granular details of software versions, file versions, and various configuration settings on multiple servers (e.g., Windows servers) simultaneously from a single user interface. The PVP system can provide functions such as definition of items to verify, selection of criteria for verification, and method for execution of the scans from a central web-based portal without having for users to log-on to the remote servers. Multiple (i.e. hundreds or even thousands) servers can be verified selectively and quickly for any item from any user workstation on the network. Each server is evaluated dynamically at run-time and only executed with configuration items which are applicable to a given server. Embodiments of this invention can create an abstraction layer which provides a simple yet efficient method for users to execute compliance verification scanning of servers without having to learn the underlying complex verification technologies.

Figure 1:
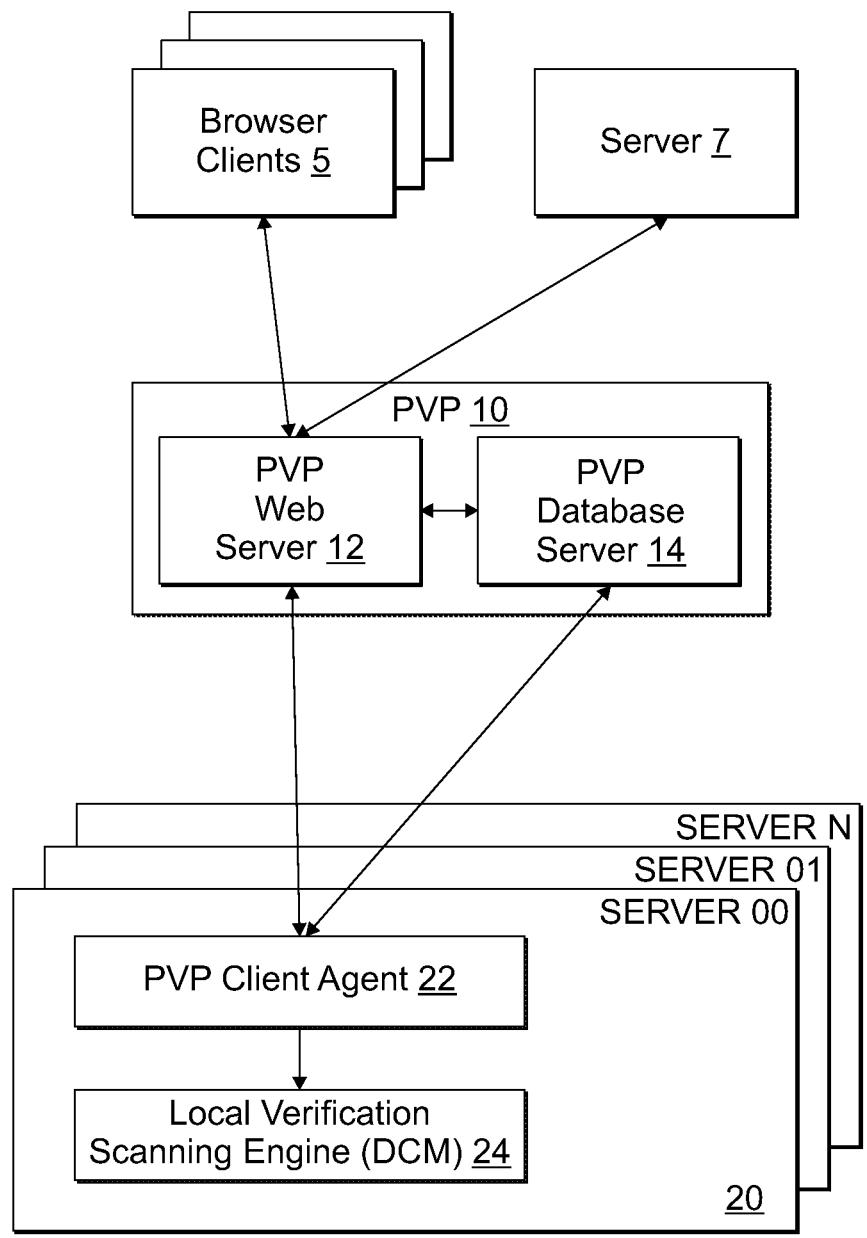
FIG. 1 is a diagram illustrating the components of a platform verification portal system according to one embodiment.

FIG. 1 is a diagram illustrating the components of a platform verification portal system according to one embodiment. As shown, the platform verification portal 10 comprises a web server 12 and a database server 14. Together, the web server and database server operatively communicate with target servers to remotely initiate and control execution of a local verification scanning engines 24 therein. In certain instances, a client agent 22 can be installed on the target servers to enable indirect communication between the platform verification portal 10 and the local verification scanning engine 24, such as Microsoft DCM.

Figure 2:
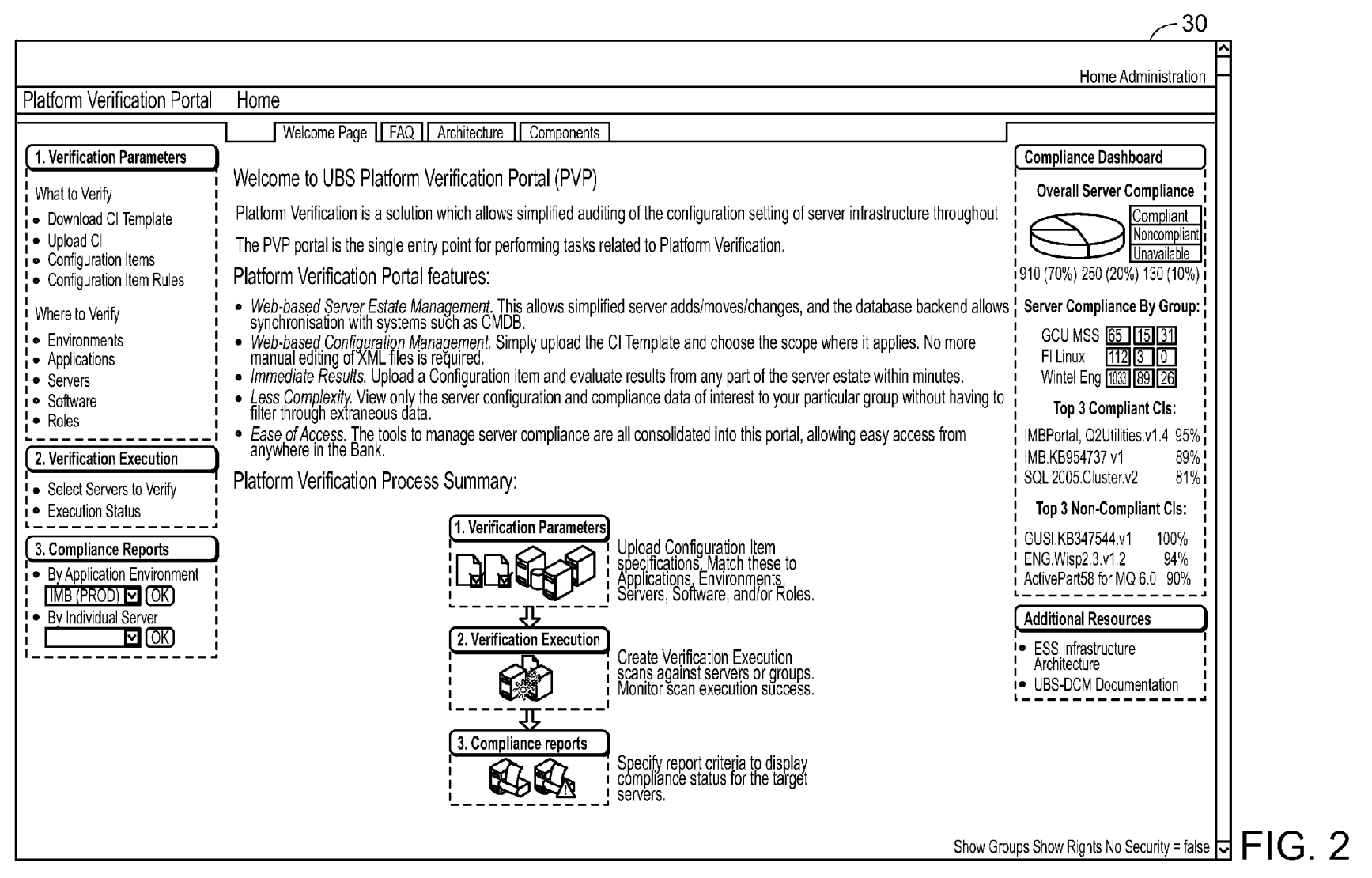

In order to provide a consolidated single point of access, the web server 12 can serve a user interface, such as the user interface 30 shown in FIG. 2, enabling browser clients 5 to perform a variety of tasks related to platform verification of a plurality of remote target servers 20. The web server 12 can also receive commands from server 7, which also enables server 7 to perform a variety of tasks related to platform verification of the remote target servers 20. Such tasks are discussed in more detail below.

Figure 3:
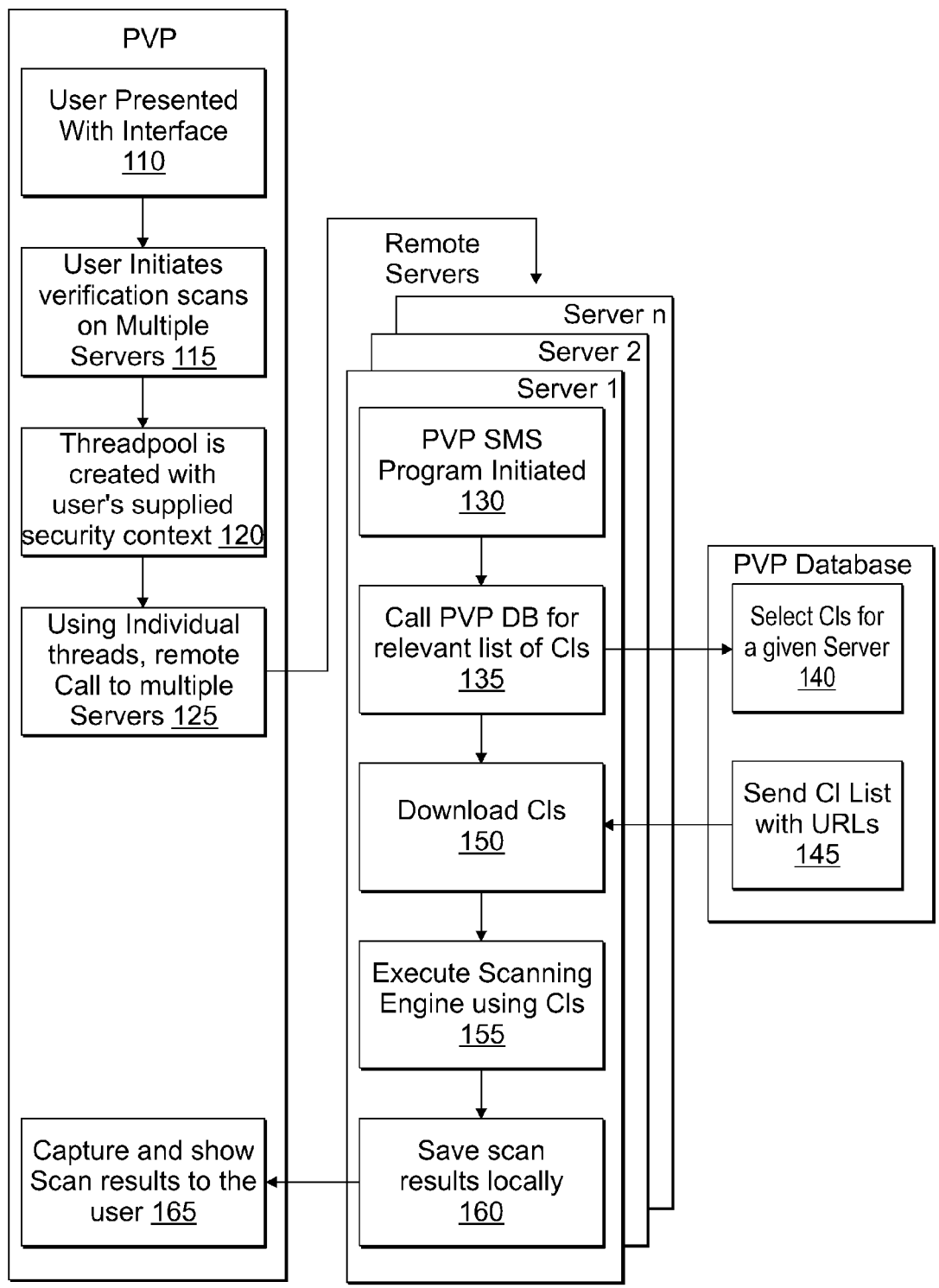
FIG. 3 is a flow diagram illustrating a method for remotely initiating verification scans simultaneously on multiple servers according to one embodiment.

Remotely Initiated, On-Demand and Selective Verification Scanning on Multiple Servers According to an aspect of the invention, the platform verification portal enables remote initiation of simultaneous, on-demand, and dynamically selective verification scans across multiple servers. FIG. 3 is a flow diagram illustrating the steps for remotely initiating such verification scans simultaneously on multiple servers according to one embodiment.

At step 110, the platform verification portal presents a user interface to select a target server or a group of target servers on which to perform the verification scans. For example, FIG. 4A is a screen shot of an exemplary user interface for selecting one or more target servers based on a user-specified set of filtering criteria. The server filter criteria 210 can include limiting the target server(s) to (i) a particular server by name or other identifiers (ii) a particular collection of servers by environment name or other identifiers, (iii) servers that execute a particular software application, (iv) servers supporting a particular software platform or operating system, (v) servers being assigned to particular roles, or (vi) any combination of rule criteria (i) through (v). Upon receipt of the filtering criteria, the platform verification portal compares the filtering criteria against server profiles stored in the database server. Servers whose profiles satisfy the filtering criteria are presented to through the user interface as candidates to queue for scanning. In the example of FIG. 4A, the candidate servers satisfying the desired server filter criteria are SERVER00 and SERVER01.

At step 115, the platform verification portal presents a user interface through which the user can remotely initiate verification scans across one or more target servers. For example, FIG. 4B is a screen shot of an exemplary user interface through which the user can remotely initiate verification scans on servers SERVER00 and SERVER01, either individually or simultaneously by clicking the "Start" or "Start All" buttons 215, 220, respectively. By clicking one of the "Cancel" buttons 225, 230 the user can pause execution of a verification scans on SERVER00, SERVER01 or both. Once a scan has been completed, the user can open and view the event log results. For example, in FIG. 4C, a user can view the event log results of a scan on corresponding server by clicking on the "view log" button 235.

At step 120, upon receiving the start command, the platform verification portal can instantiate an execution thread for each of the target servers (e.g., threadpool) in order to enable multitasking for substantially simultaneous initiation of the verification scan across the targeted servers. In true parallel processing environments, the step of instantiation of execution threads may not be necessary.

At step 125, using the individual threads, the platform verification portal transmits a remote call command to each of the individual target servers in order to initiate a verification scan.

At step 130, a client agent executing on the target server receives the remote call command from the platform verification portal (PVP) and performs a series of pre-processing steps prior to the actual invocation of the platform verification scan. In the context of a Windows-based enterprise network, communication between the platform verification portal and the client agent can be implemented according to the Microsoft Systems Management Server (SMS) messaging platform.

At step 135, the client agent transmits a request to the PVP database server at the address specified in the PVP agent configuration for a list of configuration items that are applicable to the target server. Configuration items, or CIs, are typically electronic documents, such as xml or other scripts, containing a set of verification commands that, upon execution by a verification scanning engine, determine whether a software stack or portion is properly installed and configured. Specifically, the set of verification commands can include commands to compare a set of actual software or configuration settings of the software against a desired software stack. For example, the commands may cause a verification scanning engine on a target server to confirm the presence or absence of software binaries installed on the target server, the versions of such software, and the accuracy of configuration settings (e.g., Windows Registry settings) associated with such software.

At step 140, in response to the client agent's request, the PVP database server dynamically selects a list of configuration items applicable to the target server according to the configuration item rules. Each configuration item rule stored within the PVP database server defines criteria for selecting the servers to which a corresponding configuration item applies. For example, a configuration item rule may specify that a configuration item applies to (i) a particular server by name or other identifier (ii) a particular collection of servers by environment name or other identifier, (iii) servers that execute a particular software application, (iv) servers supporting a particular software platform or operating system, (v) servers being assigned to particular roles, or (vi) any combination of rule criteria (i) through (v). The PVP database server dynamically selects the set of configuration items by processing each of the stored configuration item rules, and thereby generating a list of CIs that are applicable to the target server along with addresses identifying the location of each CI in the database. At step 145, the PVP database server responds back to the client agent with the dynamically generated list.

At step 150, upon receipt of the list of the applicable configuration items, the client agent transmits, and the PVP database server receives, a request to download preferably all of the applicable configuration items by specifying the address location of each.

At step 155, after the applicable configuration items are downloaded to the target server, the client agent executes the local verification scanning engine to perform verification scanning according to the verification commands of each configuration item.

At step 160, the scan results are stored locally on the target server. However, the scan results can be stored at any other appropriate storage location.

At step 165, the PVP web server issues a command via the client agent requesting the scan results for display to the user.

According to particular embodiments, steps 155, 160 and 165 are performed for each configuration item through enumeration as opposed to in bulk for all the configuration items.

In some embodiments, instead of a user remotely initiating verification scans through a user interface (steps 110 and 115), the verification scans can be initiated automatically (e.g., by a timer, by receipt of a command received from another server process over a network port or through interprocess communication). For example, a server can be configured to remotely build a stack for a target server. The build server can, at the time the server builds the stack, extend the build process by calling the platform verification portal (e.g., the platform verification portal 10 of FIG. 1) to initiate a verification scan of the target server. Accordingly, the build server can remotely trigger a verification scan of the target server after installing and/or updating the stack of the target server. For example, the build server can add packages (e.g., Microsoft Office, antivirus software, etc.) to the target server and initiate a verification scan at the end of the package installation. The call to the platform verification portal can be implemented as an automated API call. For example, the call can be an API call that is part of the build process parameters for the particular target server.

As discussed with respect to FIG. 3, the PVP database server applies a set of configuration item rules in order to dynamically select a list of applicable configuration items that control verification scanning on a target server. FIG. 5 is a flow diagram illustrating a method for selecting a subset of relevant configuration items dynamically at runtime for a given target server from a set of configuration items.

At step 310, the PVP database server receives a request from the client agent for a list of configuration items applicable to a target server.

At step 315, the PVP database server loads a configuration item from the database server.

At step 320 the PVP database server loads one or more configuration item rules associated with the configuration item.

At step 325, the PVP database server processes one of the configuration rules to determine whether the configuration item applies to the given target server. Processing can involve obtaining the server profile for the given target server from the database and comparing it against the selection criteria of the configuration item rule. As previously discussed, a configuration item rule may specify that a configuration item applies to (i) a particular server by name or other identifier (ii) a particular collection of servers by environment name or other identifier, (iii) servers that execute a particular software application, (iv) servers supporting a particular software platform or operating system, (v) servers being assigned to particular roles, or (vi) any combination of rule criteria (i) through (v).

At step 330, if the server profile does not satisfy the configuration item rule, the configuration item is excluded at step 335. Conversely, if, at step 330, the server profile satisfies the configuration item rule, the process continues at step 340 to determine whether there are more configuration item rules to process. If not, at step 345, the PVP database server determines whether all of the configuration item rules are satisfied by the given server profile. If so, at step 350, the configuration item is added to a dynamically generated list of applicable configuration items along with its storage location (e.g., URL) within the PVP database server.

At step 355, the PVP database server determines whether there are more configuration items to evaluate. If so, the process returns back to step 315 to load the next configuration item from the candidate list. Conversely, once all of the configuration items have been evaluated, the process terminates at step 360 with the dynamically-generated list of applicable configuration items being transmitted back to the client agent for further processing as discussed in FIG. 3.

Enabling Dynamic Selection of Configuration Items

Configuration item rules are used to perform dynamic selection of configuration items for runtime processing by a local verification scanning engine executing on a targeted server, such that configuration items that are not applicable to the targeted server are not executed.

According to another aspect of the invention, embodiments of the platform verification portal provides an automated system and method for creating the configuration item rules for dynamically selecting configuration items applicable to a target server. FIG. 6 is a flow diagram illustrating a method for creating a configuration item rule according to one embodiment.

At step 410, the platform verification portal presents a user interface through which a user can create a rule for use at runtime to dynamically select a configuration item for application to a set of target servers. Configuration item rules enable the creator of the configuration item to specify with particular granularity the server criteria to which the corresponding configuration items apply. FIG. 7 is a screen shot of an exemplary web page interface for creating a configuration item rule for an existing configuration item. In this example, the user selects the configuration item, namely Windows_Baseline, from a drop down menu 510.

At step 420, the platform verification portal receives user-specified data set that defines the desired criteria for target servers to which the selected configuration item applies. According to one embodiment, the rule criteria 520 can include limiting execution of the configuration item to (i) a particular server by name or other identifier (ii) a particular collection of servers by environment name or other identifier, (iii) servers that execute a particular software application, (iv) servers supporting a particular software platform or operating system, (v) servers being assigned to particular roles, or (vi) any combination of rule criteria (i) through (v). For example, the configuration item rule created in FIG. 7 for the "Windows baseline" item limits its execution on a particular server named SERVER01. Hence, at runtime, only the platform verification module executing on SERVER01 will be able to execute the verification commands of the "Windows baseline" configuration item. Conversely, by clicking on the check box labeled "Exclusion rule," the "Windows baseline" CI can be executed on all servers in the server estate with the exception of SERVER01.

At step 430, the platform verification portal adds the configuration item rule to the database server and associated with the corresponding configuration item. According to particular embodiments, any number of rules can be associated with a single configuration item.

Automatic Configuration Item Generation

As previously discussed, configuration items, or CIs, are typically electronic documents, such as XML or other scripts, containing a set of verification commands that, upon execution by a verification scanning engine, determine whether a software stack or portion is properly installed and configured. Specifically, a verification command or a group of verification commands confirm whether or not a particular configuration setting is in compliance with a desired value.

FIG. 8 is a diagram containing a sample verification command in a typical configuration item (CI). For example, this verification command, executable by Micosoft DCM, determines whether the version of a required file ("BTSMsg.dll") on a target server equals a desired version ("3.0.7405.0"). If not, a warning is logged as a "File version mismatch . . . " event.

Verification commands, such as that shown in FIG. 8, are typically written according to a complex, predefined structured format, such as an XML (eXtended Markup Language) based format. Applicants have found that known CI authoring tools are rather complicated, requiring significant user training to gain proficiency in their use. For example, DCM provides a graphical CI authoring tool that requires the user to navigate through the numerous processing steps in order to create a configuration item with only one verification command.

According to another aspect of the invention, embodiments of the platform verification portal provide a simplified system and method for automatically generating configuration items for processing by a platform verification module. Rather than having a user navigate through a series of graphical processing steps, the platform verification portal provides the user with a configuration item (CI) template preferably in the form of a spreadsheet containing record entries corresponding to available configuration setting parameters and default setting values. After modifying the set of configuration setting parameters and desired setting values, the CI template can be uploaded to the platform verification portal for conversion into a configuration item having verification commands in a format suitable for processing by a platform verification module, such as Microsoft DCM.

FIG. 9 is a flow diagram illustrating a method for automatically generating a configuration item according to one embodiment.

At step 510, the platform verification portal presents a user interface through which a user can request a CI template.

At step 515, after receiving the request for the CI template, the platform verification portal presents the CI template preferably in the form of a spreadsheet. FIG. 10A is a screen shot illustrating an exemplary CI template created using Microsoft Excel. Each of the active sheets corresponds to a different data source. For example, data sources on a Windows server include registries, directories, files, and initialization files, and others. In this example, the active sheet corresponds to the Windows Registry and contains multiple configuration settings parameters available for compliance checking. For example record entry ID1 specifies the parameter corresponding to the current version of Windows NT and the desired string value of "Service Pack 4." Each configuration setting record in the CI template is the basis for automatically generating the verification commands of the configuration item.

At step 520, the user populates the CI template setting desired values for applicable configuration setting parameters.

At step 525, the platform verification portal presents a user interface through which the user can upload the CI template for temporary or permanent storage on the database server. For example, FIG. 10B is a screen shot of a web page interface through which a user can browse to the populated CI template to upload (e.g., "c:\AA\PVP\Windows Baseline.xls").

Furthermore, upon a successful upload of the CI template, the platform verification portal presents a user interface through which a user may issue a command to convert the uploaded CI template into a configuration item that conforms to the required format of the platform verification module executing on the target servers. For example, FIG. 10C is a screen shot of a web page interface through which the user can convert the CI template (e.g., WindowBaseline.xls) into an XML-based configuration item suitable for execution on Microsoft DCM, (e.g. Windows_Baseline.xml) by clicking the "Convert" button. Other embodiments of automatic CI generation tool may convert the CI template into configuration items suitable for execution on other platform verification solutions, such as Stealth Audit and OpsWare Server Automation System.

At step 530, the platform verification portal loads the populated CI template, e.g., Microsoft Excel spreadsheet into memory.

At step 535, the platform verification portal also loads a blank configuration item form (e.g., XML CI file) into memory.

At step 540, the platform verification portal reads a row from the spreadsheet.

At step 545, the platform verification portal uses row data from the spreadsheet to construct a predefined verification string according to a defined format, such as XML. For example, FIG. 10D is a screen shot of a row in an exemplary spreadsheet that is used to construct the verification string in the configuration item of FIG. 8.

At step 550, the platform verification portal appends the verification string to the configuration item form.

At step 555, the process continues back to step 540 to obtain the next row from the spreadsheet.

At step 560, upon a successful conversion, the platform verification portal closes the configuration item file and presents a user interface through which a user may view details of the conversion and import the resulting configuration item into database server for later use. For example, FIG. 10E is a screen shot of a web page interface that displays the number of verification commands, or verification rules, that were generated according to the different data sources. An "Import" button is also displayed to enable the user to import the resulting configuration item, namely "Windows_baseline.xls," into the database server.

The above-described techniques can be implemented in digital electronic circuitry, or in computer hardware, firmware, software, or in combinations of them. The implementation can also be in another form that is not electronic in nature but performs the same outcome of filtering. The implementation can be as a computer program product, e.g., in a machine-readable storage device or in a propagated signal, for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network.

Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software and/or hardware component which performs certain tasks. A module may advantageously be configured to reside on addressable storage medium and configured to execute on one or more processors. A module may be fully or partially implemented with a general purpose integrated circuit (IC), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

While this invention has been particularly shown and described with references to preferred embodiments thereof, it will be understood by those skilled in the art that various changes in form and details may be made therein without departing from the scope of the invention encompassed by the appended claims.

What is claimed:

1. An automated computerized method for performing verification scanning, comprising:

storing, at a database, a plurality of configuration items comprising at least a first configuration item and a second configuration item, the first configuration item comprising one or more verification commands, a first verification command comprising information related to compliance with a configuration setting of the first configuration item;

storing, at the database, a plurality of configuration item rules associated with the plurality of configuration items, the plurality of configuration item rules comprising at least a first configuration item rule and a second configuration item rule, the first configuration item rule defining server criteria associated with the corresponding first configuration item;

remotely initiating execution, by a server communicably coupled to the database, of one or more verification scanning engines of a respective one or more target servers;

receiving a request for configuration items for a first target server of the one or more target servers;

responsive to receiving the request for configuration items, determining whether the configuration items apply to the first target server based on the associated one or more configuration item rules, wherein determining comprises, for at least the first configuration item and the second configuration item stored in the database:

determining whether the configuration item applies to the first target server based on the one or more configuration item rules associated with the configuration item; and when the one or more configuration item rules associated with the configuration item applies to the first target server, adding the configuration item to a list of applicable configuration items for the first target server;

communicating, to the first target server, the list of applicable configuration items.

2. The method of claim 1, wherein initiating execution, by the server communicably coupled to the database, of one or more verification scanning engines comprises remotely initiating simultaneous execution of a plurality of verification scanning engines of a respective plurality of target servers.

3. The method of claim 1, wherein initiating execution, by the server communicably coupled to the database, of one or more verification scanning engines comprises receiving a command via an electronic user interface of the server, the command comprising one or more instructions for initiation of the one or more verification scanning engines.

4. The method of claim 1, wherein initiating execution, by the server communicably coupled to the database, of one or more verification scanning engines comprises receiving a command from a second server, the command comprising one or more instructions for initiation of the one or more verification scanning engines.

5. The method of claim 1, wherein determining whether the first configuration item applies to the first target server based on the one or more configuration item rules associated with the configuration item comprises:
   for a first configuration item rule of the one or more configuration item rules associated with the first configuration item, comparing a server profile of the first target server with server criteria of the first configuration item rule.

6. The method of claim 1,
   wherein the first configuration item is associated with a plurality of configuration item rules comprising at least a first configuration item rule and a second configuration item rule, and
   wherein determining whether the first configuration item applies to the first target server based on the associated one or more configuration item rules comprises:
      for a first configuration item rule of the one or more configuration item rules associated with the first configuration item, comparing a server profile of the first target server with server criteria of the first configuration item rule,
      when the server profile of the first target server matches server criteria of the first configuration item rule, comparing the server profile of the first target server with server criteria of the second configuration rule, and
      when the server profile of the first target server matches the server criteria of the second configuration rule, adding the first configuration item to the list of applicable configuration items.

7. The method of claim 1, further comprising:
   receiving, via an electronic user interface of the server, one or more verification commands for a new configuration item;
   receiving, via the electronic user interface, one or more server criteria as respective one or more new configuration item rules for the new configuration item;
   storing, at the database, the new configuration item and the one or more new configuration item rules;
   associating, at the database, the new configuration item and the one or more new configuration item rules.

8. The method of claim 1, further comprising:
   receiving, via an electronic user interface of the server, one or more entries corresponding to one or more configuration setting parameters for a new configuration item;
   populating one or more values of the respective one or more configuration setting parameters with the received one or more entries;
   translating the populated one or more configuration setting parameters into a configuration item, the configuration item comprising an electronic document comprising one or more verification commands derived from the respective populated one or more configuration setting parameters.

9. The method of claim 8, wherein a first verification command of the one or more verification commands comprise one or more configuration setting parameters as predefined structured language.

10. The method of claim 1, wherein server criteria may comprise one or more of: server identifier, servers that execute a specific software application, servers that support a specific software platform, servers that support a specific operating system, or servers assigned to a specific role.

11. The method of claim 10, wherein a configuration item rule may comprise exclusion of one or more server criteria.

12. The method of claim 1, wherein determining whether the configuration items apply to a second target server of the one or more target servers based on the associated one or more configuration item rules comprises:
   for at least the first configuration item and the second configuration item stored in the database, determining whether the configuration item applies to the second target server based on the associated one or more configuration item rules; and
   when the one or more configuration item rules associated with the configuration item applies to the second target server, adding the configuration item to a second list of applicable configuration items for the second target server;
   communicating, to the second target server, the second list of applicable configuration items, the second list of applicable configuration items being different from the list of applicable configuration items.

13. The method of claim 1, further comprising:
   receiving, via an electronic user interface of the server, one or more filtering criteria for a plurality of target servers; and
   selecting, via the electronic user interface, the one or more target servers on which to initiate execution of the respective one or more verification scanning engines based on the received filtering criteria.

14. The method of claim 1, wherein the filtering criteria comprise one or more of: server identifier, environment name, servers that execute a specific application, servers that support a specific software platform, servers that support a specific operating system, or servers assigned to a specific role.

15. The method of claim 1, wherein initiating execution of the one or more verification scanning engines comprises automatically initiating execution of the one or more verification scanning engines.

16. The method of claim 1, wherein initiating execution of the one or more verification scanning engines comprises automatically initiating execution of the one or more verification scanning engines responsive to building a stack at the respective one or more target servers.

17. The method of claim 8, wherein translating the populated one or more configuration setting parameters into a configuration item comprises:
   maintaining a blank configuration item form;
   for at least a first configuration setting parameter and a second configuration setting parameter of the one or more configuration setting parameters:
      constructing a predefined verification string based on a value populated in the configuration setting parameter; and
      adding the predefined verification string to the blank configuration item form; and
   storing, at the database, the blank configuration item form as a new configuration item.

18. A non-transitory computer readable medium comprising computer-executable instructions for performing verification scanning, wherein one or more processors may execute the computer-executable instructions to cause a data processing apparatus to:
  store a plurality of configuration items comprising at least a first configuration item and a second configuration item, the first configuration item comprising one or more verification commands, a first verification command comprising information related to compliance with a configuration setting of the first configuration item;
  store a plurality of configuration item rules associated with the plurality of configuration items, the plurality of configuration item rules comprising at least a first configuration item rule and a second configuration item rule, the first configuration item rule defining server criteria associated with the corresponding first configuration item;
  remotely initiate execution of one or more verification scanning engines of a respective one or more target servers;
  receive a request for configuration items for a first target server of the one or more target servers;
  responsive to receiving the request for configuration items, determining whether the configuration items apply to the first target server based on the associated one or more configuration item rules, wherein determining comprises, for at least the first configuration item and the second configuration item stored in the database:
    determining whether the configuration item applies to the first target server based on the one or more configuration item rules associated with the configuration item; and
    when the one or more configuration item rules associated with the configuration item applies to the first target server, adding the configuration item to a list of applicable configuration items for the first target server;
  communicating, to the first target server, the list of applicable configuration items.

19. A system for performing verification scanning, the system comprising:
  a web server comprising one or more processors configured to remotely initiate execution of one or more verification scanning engines of a respective one or more target servers, wherein the selected set of target servers comprises one or more target servers; and
  a database communicably coupled to the web server, the database configured to:
    store a plurality of configuration items comprising at least a first configuration item and a second configuration item, the first configuration item comprising one or more verification commands, a first verification command comprising information related to compliance with a configuration setting of the first configuration item;
    store a plurality of configuration item rules associated with the plurality of configuration items, the plurality of configuration item rules comprising at least a first configuration item rule and a second configuration item rule, the first configuration item rule defining server criteria associated with the corresponding first configuration item;
    receive a request for configuration items for a first target server of the one or more target servers;
  responsive to receiving the request for configuration items, determining whether the configuration items apply to the first target server based on the associated one or more configuration item rules, wherein determining comprises, for at least the first configuration item and the second configuration item stored in the database:
    determining whether the configuration item applies to the first target server based on the one or more configuration item rules associated with the configuration item; and
    when the one or more configuration item rules associated with the configuration item applies to the first target server, adding the configuration item to a list of applicable configuration items for the first target server;
  communicating, to the first target server, the list of applicable configuration items.

* * * * *